United States Patent
Niessner et al.

(10) Patent No.: US 10,910,797 B2
(45) Date of Patent: Feb. 2, 2021

(54) INSULATOR ARRANGEMENT FOR A SPARK PLUG ARRANGEMENT, AND SPARK PLUG ARRANGEMENT

(71) Applicant: Federal-Mogul Ignition GmbH, Neuhaus-Schierschnitz (DE)

(72) Inventors: Werner Niessner, Steinheim (DE); Andreas Zeh, Sonneberg (DE)

(73) Assignee: FEDERAL-MOGUL IGNITION GMBH, Neuhaus-Schierschni (DE)

(*) Notice: Subject to any disclaimer, the term of this patent is extended or adjusted under 35 U.S.C. 154(b) by 0 days.

(21) Appl. No.: 16/690,703

(22) Filed: Nov. 21, 2019

(65) Prior Publication Data
US 2020/0176955 A1 Jun. 4, 2020

(30) Foreign Application Priority Data
Nov. 30, 2018 (DE) .......................... 10 2018 130 539

(51) Int. Cl.
*H01T 13/36* (2006.01)
*H01B 17/58* (2006.01)
*F02B 19/12* (2006.01)

(52) U.S. Cl.
CPC .............. *H01T 13/36* (2013.01); *F02B 19/12* (2013.01); *H01B 17/58* (2013.01)

(58) Field of Classification Search
CPC .......... F02B 19/12; F02B 19/16; H01T 13/36; H01T 13/40; H01T 13/54; H01B 17/58
See application file for complete search history.

(56) References Cited

U.S. PATENT DOCUMENTS

| | | |
|---|---|---|
| 1,491,752 A | 4/1924 | Richey |
| 3,046,435 A | 7/1962 | Campbell |
| 4,110,667 A | 8/1978 | Graf Vom Hagen |
| 4,123,998 A * | 11/1978 | Heintzelman ........... F02B 19/12 123/280 |
| 4,327,702 A | 5/1982 | Imai et al. |
| 4,337,408 A | 6/1982 | Sone et al. |

(Continued)

FOREIGN PATENT DOCUMENTS

| | | |
|---|---|---|
| DE | 102011053530 A1 | 5/2012 |
| DE | 102014004943 A1 | 2/2015 |

(Continued)

OTHER PUBLICATIONS

Office action issued for the German Application# 10 2018 130 539.7 dated Jun. 26, 2019; 6 pages.

(Continued)

*Primary Examiner* — Sizo B Vilakazi
*Assistant Examiner* — Anthony L Bacon
(74) *Attorney, Agent, or Firm* — Reising Ethington, P.C.

(57) ABSTRACT

An insulator arrangement for a spark plug arrangement, in particular for a prechamber spark plug, with an elongated body that has an insulator arrangement longitudinal bore for accommodating a center electrode arrangement and has a front end. A sealing shoulder is formed on an outer circumferential section of the body. An axial transition section is formed between the sealing shoulder and the front end of the body. The front end of the body is designed such that at least 50% of a gas flow impinging thereon in a first direction is deflected in a direction opposite to the first direction.

12 Claims, 3 Drawing Sheets

(56) References Cited

U.S. PATENT DOCUMENTS

Figure 1:
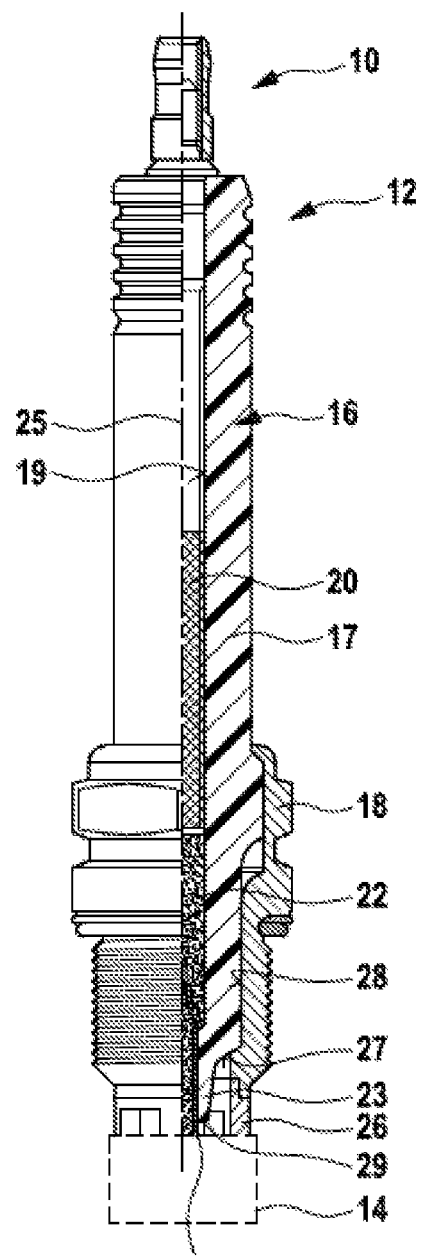

| | | |
|---|---|---|
| 4,396,855 A | 8/1983 | Imai et al. |
| 4,795,937 A | 1/1989 | Wagner et al. |
| 4,963,784 A | 10/1990 | Niessner |
| 5,091,672 A * | 2/1992 | Below .................. H01T 13/32 |
| | | 123/169 R |
| 5,633,557 A | 5/1997 | Lindsay |
| 9,444,228 B2 | 9/2016 | Niessner et al. |
| 9,874,135 B2 | 1/2018 | Sotiropoulou et al. |
| 10,014,666 B1 * | 7/2018 | Bresler .................. H01T 13/16 |
| 2005/0211217 A1 | 9/2005 | Boley |
| 2009/0309475 A1 * | 12/2009 | Tozzi .................... F02B 19/12 |
| | | 313/143 |
| 2014/0102404 A1 | 4/2014 | Sotiropoulou et al. |
| 2014/0261296 A1 * | 9/2014 | Sotiropoulou ...... F02B 19/1014 |
| | | 123/260 |
| 2015/0040845 A1 * | 2/2015 | Chiera .................. F02B 19/18 |
| | | 123/41.32 |
| 2016/0053673 A1 * | 2/2016 | Sotiropoulou .......... F02B 19/18 |
| | | 123/260 |
| 2017/0145898 A1 * | 5/2017 | Schafer ................ H01T 13/467 |
| 2018/0038337 A1 * | 2/2018 | Mukoyama ............ F02P 9/007 |

FOREIGN PATENT DOCUMENTS

| | | |
|---|---|---|
| DE | 102014105687 B3 | 10/2015 |
| DE | 102014015707 A1 | 12/2015 |
| GB | 154123 A1 | 11/1920 |
| WO | WO9108603 A1 | 6/1991 |

OTHER PUBLICATIONS

Informal Translation of Office action issued for the German Application# 10 2018 130 539.7 dated Jun. 26, 2019; 6 pages.

* cited by examiner

INSULATOR ARRANGEMENT FOR A SPARK PLUG ARRANGEMENT, AND SPARK PLUG ARRANGEMENT

REFERENCE TO RELATED APPLICATIONS

This application claims the benefit of German Application No. 10 2018 130539.7, filed on Nov. 30, 2018, the contents of which are hereby incorporated by reference in their entirety.

FIELD

The present disclosure relates to an insulator arrangement for a spark plug and, in particular, to a prechamber spark plug with an elongated body that has an insulator arrangement longitudinal bore for accommodating a center electrode arrangement and has a front end, wherein a sealing shoulder is formed on an outer circumferential section of the body, and wherein an axial transition section is formed between the sealing shoulder and the front end of the body.

In addition, the present disclosure relates to a spark plug for an internal combustion engine and, in particular, to a spark plug with a shell that has a shell longitudinal bore, an insulator arrangement whose body is at least partially accommodated in the shell longitudinal bore, and with a center electrode arrangement that is accommodated in an insulator arrangement longitudinal bore, wherein a ground electrode arrangement and the center electrode arrangement are connected to one another by at least one ignition gap, in particular an annular gap, and wherein the ignition gap preferably is arranged inside a prechamber.

BACKGROUND

A spark plug arrangement of the above-described type is known, for example from the document DE 10 2014 004 943 A1. From this document, a prechamber spark plug is known that has a prechamber cap to form a prechamber combustion chamber, with a cylindrical center electrode and an annular ground electrode, wherein the prechamber cap has a center opening that has a radial offset with respect to a longitudinal center axis and/or is oriented at an angle to the longitudinal center axis.

Another prechamber spark plug is known from the document WO 91/08603. Prechamber spark plugs generally have a prechamber at the front end, within which prechamber is located a spark gap or ignition gap. The prechamber is connected to the actual combustion chamber through openings. Such prechamber spark plugs can be used, for example, for the ignition of lean air/fuel mixtures, such as in gas-powered internal combustion engines. The prechamber is a precombustion chamber in this context. Mixture flowing into the prechamber is ignited by means of an ignition spark. The flame produced in the prechamber as a result is conveyed through the openings in the direction of the actual combustion chamber, where it ignites the lean mixture.

In prechamber spark plugs, the spark plug prechamber is filled with a fuel/air mixture in the compression stroke, namely by a movement of a piston in the direction of a top dead center point. The in-flow of the gas/air mixture is of importance here, because this mixture must be introduced into the prechamber such that an ignition by an electric spark is ensured in all operating points. Frequently, prechamber spark plugs have an annular ignition gap. When the prechamber is filled, this gap must be supplied with fresh, ignitable combustion gas in such a manner that reliable ignition takes place.

As a result of the spark discharge, metallic particles may be detached from the electrodes and are then transported along with the gas/air flow. These particles can be deposited on a transition section of an insulator arrangement and form an electrically conductive metallic coating (in a manner similar to sputtering). This can result in an electrical shunt and prevent reliable spark formation.

SUMMARY

Against this background, it is an object of the application to specify an improved insulator arrangement for a spark plug arrangement, and also to specify an improved spark plug arrangement.

The above object may be attained, firstly, by an insulator arrangement for a spark plug arrangement, in particular for a prechamber spark plug, with an elongated body that has an insulator arrangement longitudinal bore for accommodating a center electrode arrangement and has a front end, wherein a sealing shoulder is formed on an outer circumferential section of the body, wherein an axial transition section is formed between the sealing shoulder and the front end of the body, and wherein the front end of the body is designed such that at least 50% of a gas flow impinging thereon in a first direction is deflected in a direction opposite to the first direction.

In addition, the above object may be attained by a spark plug arrangement for an internal combustion engine, with a shell that has a shell longitudinal bore, with an insulator arrangement, wherein the body of the insulator arrangement is at least partially accommodated in the shell longitudinal bore, and with a center electrode arrangement that is accommodated in the insulator arrangement longitudinal bore, wherein a ground electrode arrangement and the center electrode arrangement are connected to one another by at least one ignition gap, and wherein the ignition gap preferably is arranged inside a prechamber.

As a result of the measure of designing the front end of the body of the insulator arrangement such that at least 50% of a gas flow impinging thereon in a first direction is deflected in a direction opposite to the first direction, the insulator arrangement can ensure, when it is in the installed state, that its transition section is covered with a smaller proportion of atomized metallic particles so that the risk that an electrically conductive metallic coating forms on the transition section is reduced.

In some cases, the deflection may be such that no deposits are formed on the surface of the transition section, which can also be referred to as the insulator nose. Accordingly, a high ohmic shunt resistance continues to exist. Consequently, a required spark formation between the center electrode arrangement and an annular ground electrode arrangement can be ensured.

In the spark plug arrangement, it is preferably the case that an ignitable fuel/air mixture or combustion gas (these terms are used synonymously hereinbelow) is directed in the first direction into an annular gap between a central center electrode and an annular ground electrode, namely during the compression stroke of the internal combustion engine.

The ignited gas emerging in the first direction from the annular ignition gap, which may contain atomized metallic particles from at least one of the electrodes on account of the spark discharge, may then be deflected in the opposite direction by the insulator arrangement on the front end. In this process, this ignited gas is preferably directed past the annular electrode on the outside. As a result, gas can still flow out from the annular ignition gap in the direction toward the front end of the insulator arrangement, where it can be deflected in the opposite direction again.

The first direction is preferably a direction from a prechamber cap in the direction toward an ignition gap, in particular an annular ignition gap, and is, in particular, a longitudinal direction that is directed toward the front end of the body of the insulator arrangement, whereas the second direction is preferably directed away from the front end of the body.

The spark plug arrangement preferably contains a prechamber spark plug with a prechamber cap that forms a prechamber.

A volume of the prechamber is preferably less than 1.2 $cm^3$.

The center electrode arrangement and/or the ground electrode arrangement can be made of different materials in the region of the annular ignition gap, including metal alloys that contain at least one precious metal, such as ruthenium, iridium, etc.

In the insulator arrangement, preferably the front end is oriented generally transversely to a longitudinal axis of the body and has a deflection recess.

The deflection recess is preferably an annular recess. The deflection recess preferably extends over a range between greater than or equal to 270° and less than or equal to 360°. Preferably, the deflection recess is completely annular. Furthermore, it is preferable that a cross-section of the deflection recess (which is to say an area of the deflection recess in a longitudinal section) is relatively constant or uniform over the circumference of the deflection recess.

The deflection recess preferably has an axial depth in a range from 1 mm to 5 mm.

It may be especially advantageous when a ratio between an axial depth of the deflection recess and an outer radius of the front end of the body lies in a range from 0.1 to 1.0, in particular in a range from 0.2 to 0.5.

As a result, on the one hand the deflection recess can have such a size in cross-section that an efficient deflection is made possible. On the other hand, the stability of the front area is not diminished too much as a result.

The deflection recess can be open radially to the inside so that it is not spaced apart from the inner circumference of the body. Furthermore, the deflection recess can extend all the way to an outer circumference of the body in the region of the front end.

It may be especially advantageous, however, when the deflection recess is spaced apart from an inner circumference of the body in the region of the front end and/or when the deflection recess is spaced apart from an outer circumference of the body in the region of the front end.

As a result, the front end can be produced with a high stability.

The deflection recess can have any desired shape in longitudinal section, in particular it can be polygonal or otherwise angular in design.

It may be especially advantageous, however, when the deflection recess is arch-shaped in its cross-section (which is to say, in a view in a longitudinal section of the insulator arrangement).

In this context, the arch shape preferably has a deepest section or peak section in which the deflection recess is deepest (viewed from the front end of the body).

A deflection recess that is arch-shaped in cross-section corresponds essentially to a concave recess in this case.

In this context, it may be especially advantageous when a ratio between (i) a distance between a deepest section of the deflection recess and an inner circumference of the body in the region of the front end and (ii) a distance between the deepest section of the deflection recess and an outer circumference of the body in the region of the front end lies in a range from 1:3 to 3:1, in particular in a range from 1:2 to 1:1.

It may be especially advantageous when this ratio is less than 1, for example in a range from 0.7:1 to 0.95:1.

As a result of this measure, the gas flow impinging on the front end can be deflected in the opposite direction quite well.

On the whole, it may be advantageous when the transition section is designed as a conical section that is inclined with respect to the longitudinal axis by an angle that is greater than 10° and/or is less than 85°.

Furthermore, it may be advantageous when a deflection recess is formed at the front end of the body radially to the outside with an inclined, annular axial wall that is inclined at an angle of greater than 20°, in particular greater than 30°, in particular greater than 40° and/or less than or equal to 90°, in particular less than 85°, in particular less than 75°, with respect to a longitudinal axis.

In the case of an arch-shaped deflection recess, the inclined, annular axial wall is the arch surface located radially on the outside of the arch-shaped deflection recess. The arch-shaped deflection recess in this case can be straight in design in the region of the inclined axial wall so that the annular axial wall is designed as a conical surface, but can also be curved in design.

In the spark plug, it may be advantageous when the prechamber is covered by a prechamber cap, wherein the prechamber cap has no central bore, and wherein the prechamber cap has at least one, preferably a multiplicity of, radial or lateral bores.

The volume of the prechamber may preferably be smaller than 1.2 $cm^3$ in this case.

In the case of such small prechamber volumes, it has proven to be the case that the in-flow of the gas/air mixture in the compression stroke is advantageous with radially or laterally arranged bores without the use of a central bore. As a result, it is possible to force an in-flow of the combustion gas into the electrode gap or ignition gap in the first direction, in particular.

Accordingly, it may be advantageous when the radial bore(s) is or are oriented such that a gas flow flowing into the prechamber is directed at the ignition gap between the center electrode arrangement and the ground electrode arrangement, and to be more precise in the first direction, in particular.

It is a matter of course that the features cited above and those explained below can be used not only in the combinations stated in each case, but also in other combinations or alone, without departing from the scope of the present invention.

DRAWINGS

Figure 2:
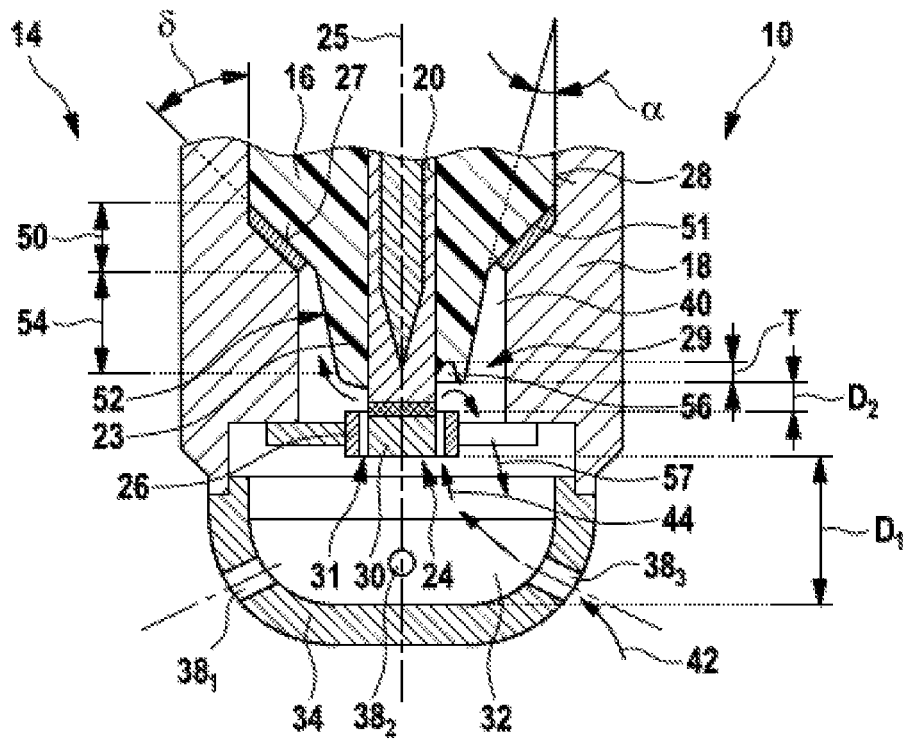
Figure 3:
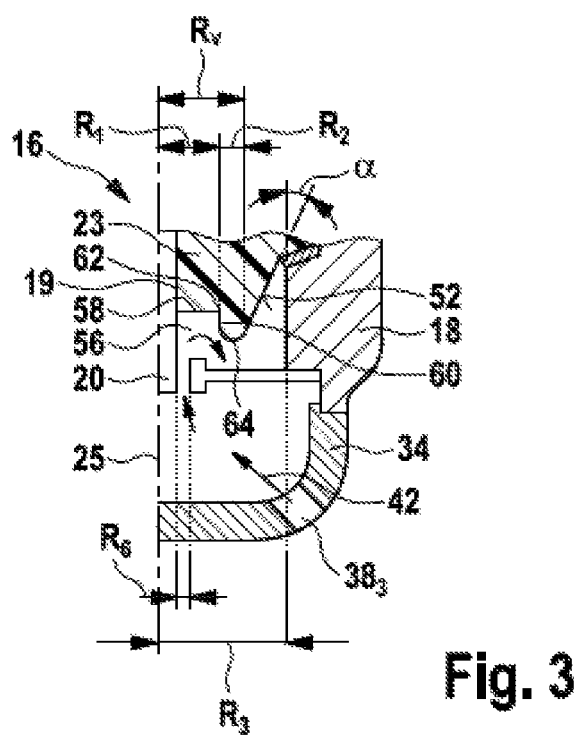
Figure 4:
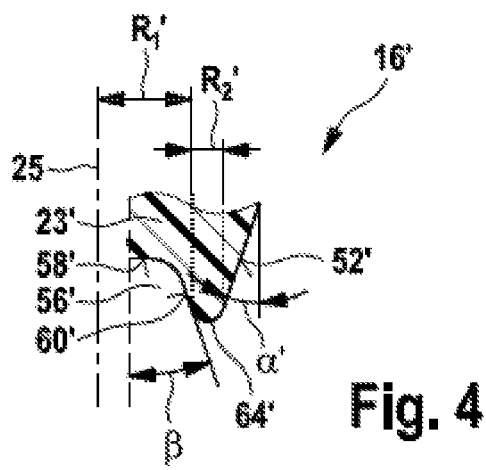
Figure 5:
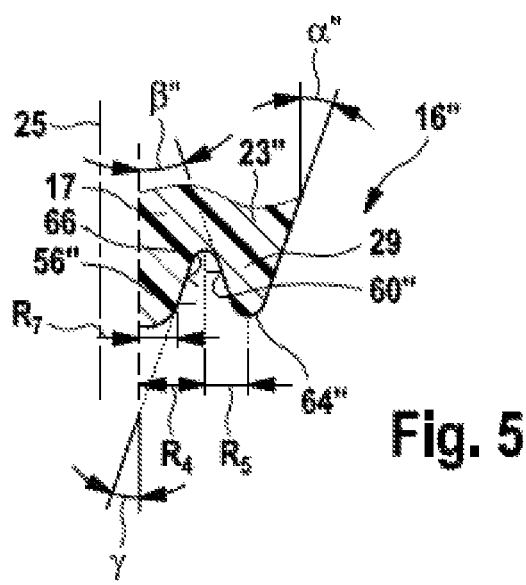
Figure 6:
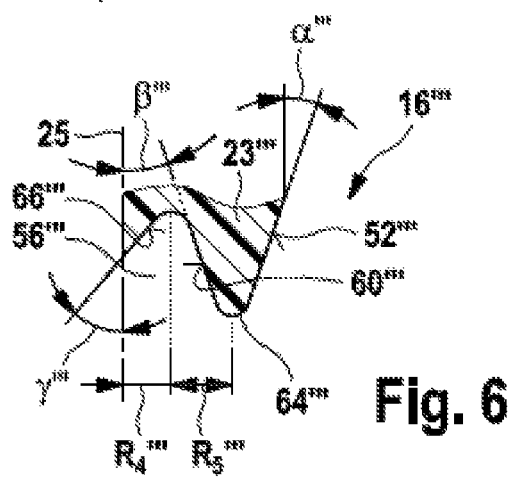

Exemplary embodiments are shown in the drawings, and are explained in detail in the description below. Shown are:

FIG. 1 a schematic representation of a spark plug for a motor vehicle with an insulator arrangement and with a schematically indicated ignition section;

FIG. 2 an embodiment of an ignition section with an insulator arrangement, in particular for the spark plug from FIG. 1;

FIG. 3 a detail view of another embodiment of an ignition section with another embodiment of an insulator arrangement;

FIG. 4 a detail view of another embodiment of an insulator arrangement for a spark plug arrangement;

FIG. 5 a detail view of another embodiment of an insulator arrangement for a spark plug arrangement; and FIG. 6 a detail view of another embodiment of an insulator arrangement for a spark plug arrangement.

DESCRIPTION

A spark plug arrangement is shown in schematic form, and labeled generally with the number 10, in FIG. 1.

The spark plug arrangement 10 has a spark plug body 12, at the front end of which is formed an ignition section 14.

The spark plug body 12 contains an insulator arrangement 16, around which is located a metal shell 18. The insulator arrangement 16 has an essentially sleeve-like body 17 and can be made of a ceramic material, for example. As a rule, the metal shell 18 has a thread by means of which the spark plug arrangement 10 can be screwed into a cylinder head of an internal combustion engine.

Centrally within the insulator arrangement 16, in the body 17, is formed an insulator arrangement longitudinal bore 19, in which an electrical terminal element 20 is provided. The terminal element 20 extends in the axial direction all the way through the spark plug body 12 so that a spark plug connector, through which electrical energy can be introduced to produce spark pulses, can be placed on an end of the spark plug body 12 that is axially opposite the ignition section 14. In the interior of the insulator arrangement 16, the terminal element 20 is electrically connected to a connecting element 22, which in turn is electrically connected to a center electrode arrangement 24. The center electrode arrangement 24 extends in the axial direction and along a general longitudinal axis 25 out of the insulator arrangement 16, namely in the axial direction with respect to a nose 23 of the body 17. The center electrode arrangement 24 extends into the ignition section 14 schematically shown in FIG. 1 in this design.

FIG. 1 additionally shows that the metal shell 18 is electrically connected to a ground electrode arrangement 26, which likewise extends into the ignition section 14.

The insulator arrangement 16 is accommodated in a shell longitudinal bore 28, which has an outer diameter not shown in detail. The insulator arrangement 16 has an outer diameter in the region of this longitudinal bore 28 from which a sealing shoulder 27 extends towards the ignition section 14, which sealing shoulder is oriented at an angle to the longitudinal axis 25 and can be designed as a conical surface, for example. The sealing shoulder 27 transitions into the above-mentioned nose 23, which can likewise be designed to be conical at the outer circumference, but preferably is more acute-angled than the sealing shoulder 27. The nose 23 of the body 17 has a front end 29 that faces the firing tip 30.

Even though this is not shown in detail in FIG. 1, the front end 29 of the body 17 preferably has a shape such that at least 50%, or at least 60%, or at least 75%, of a gas flow impinging thereon in a first direction is deflected in a direction opposite to the first direction.

The first direction in this case preferably is an axial direction from the firing tip 30 to the body 17 of the insulator arrangement 16. The opposite direction preferably is an opposite axial direction.

When an "axially oriented gas flow" is referred to in the present application, it should be understood that the axial direction in this case is a primary direction. On account of corners, edges, etc., such a gas flow can in general have irregularities or turbulence, as a result of which it is possible that the gas flow is not completely and exclusively axially oriented. However, an axially oriented gas flow is understood to mean that it contains at least 50%, and in some cases at least 75%, of axially moving components.

FIG. 2 is a detail view of an ignition section 14 of a spark plug arrangement 10, which can correspond in general to the spark plug arrangement 10 from FIG. 1 in terms of structure and operating principle.

It is evident in FIG. 2 that the electrical terminal element 20 is connected to a firing tip 30 that forms the center electrode arrangement 24. The firing tip 30 can be designed as a cylindrical element, for example, that is coaxial to the longitudinal axis 25.

It is further evident that the ground electrode arrangement 26, which is electrically connected to the metal shell 18, has an annular element that coaxially surrounds the firing tip 30. In this way an annular gap 31 is created between the ground electrode arrangement 26 and the firing tip 30, forming an ignition gap or spark gap within which a fuel mixture can be ignited.

The center electrode arrangement 24 with the firing tip 30 placed thereon, along with the ground electrode arrangement 26, are located in the interior of a prechamber 32 that is spatially delimited, namely by the insulator 16 and the metal shell 18 toward one axial side and by a prechamber cap 34 toward the other axial side, wherein the prechamber cap 34 is connected, preferably is electrically connected, to the metal shell 18.

The prechamber cap 34 preferably has no central opening that is coaxial to the longitudinal axis 25. However, the prechamber cap 34 has a multiplicity of lateral openings 38 through which a fuel mixture 42 can enter the prechamber 32. In addition, an ignited fuel mixture or a flame can exit through the lateral openings 38.

The prechamber cap 34 forms a closed, primarily radially oriented, bottom section that is spaced apart from a lower side of the annular gap 31 by a distance $D_1$. An upper side of the annular gap 31, which faces toward the insulator arrangement 16, is spaced apart from the front end 29 of the body 17 by a distance $D_2$. $D_2$ is preferably smaller than $D_1$.

It is also evident in FIG. 2 that the gas mixture 42 can enter the annular gap 31 in a first axial direction 44 that is oriented in the direction toward the insulator arrangement 16 from the prechamber 32.

In addition, it is evident in FIG. 2 that the sealing shoulder 27 extends in the axial direction over a sealing shoulder section 50 and rests on a corresponding conical surface of the metal shell 18 by means of a seal 51, which can be implemented as a conical ring, so as to seal a space between the annular gap 31 and the sealing shoulder section 50 in this manner.

It can also be seen in FIG. 2 that in a transition section from the sealing shoulder section 50 to the front end 29 of the body 17, the nose 23 has on its outer circumference a conical nose surface 52 that is oriented at an angle α. It can also be seen in FIG. 2 that the sealing shoulder 27 is oriented at an angle δ with respect to the longitudinal axis 25. Preferably α is smaller than δ.

Finally, it is evident from FIG. 2 that the front end 29 of the body 17 is designed such that at least 50% of a gas flow 42 impinging thereon in the first direction 44, which preferably has passed through the annular gap 31, is deflected in a direction 57 generally opposite to the first direction 44. For this purpose, a deflection recess 56 is provided at the front end of the body 17. The deflection recess 56 is preferably designed as an arch-shaped recess that extends annularly at least by 270° around the longitudinal axis 25 and has an axial depth T. T is preferably smaller than $D_2$.

While a gas flow impinging on the front end 29 in the prior art is mainly directed past the front end in the direction toward the sealing shoulder section 50, in the present embodiment at least 50% of this gas flow is directed back in the opposite direction.

Consequently, it is possible to prevent or at least decrease the problem that metallic particles that may be detached from the electrode arrangements 26, 30 (on account of a spark discharge) are transported along with the gas/air flow and are deposited on a transition section, in particular next to the sealing shoulder section 50. Such metallic particles can form a conductive metallic coating (in a manner similar to sputtering) in this case so that an electrical shunt may possibly be produced, which can prevent or diminish reliable spark formation in the annular gap 31.

Shown in the following FIGS. 3 to 6 are additional embodiments of insulator arrangements 16, which correspond in general to the insulator arrangement 16 from FIG. 2 in terms of structure and operating principle. The same elements are therefore labeled with the same reference symbols. Primarily the differences are explained below.

It is evident in FIG. 3 that the deflection recess 56 has a radial wall 58 extending essentially radially, as well as an axial wall 60 that is spaced apart radially from the insulator arrangement longitudinal bore 19. The axial wall 60 transitions into the radial wall 58 through a radius 62. The deflection recess 56 is formed on the radially inner side not by the body 17, but instead by the electrical terminal element 20 or by a part of the center electrode arrangement 24. The axial wall 60 transitions into the conical nose surface 52 through a projection. The axial wall 60 is spaced apart radially from the longitudinal axis 25 by a distance $R_1$. Preferably $R_1$ is greater than $R_6$, wherein $R_6$ is the radial distance of the annular gap 31.

In addition, the axial wall 60 is spaced apart from the conical nose surface 52 in the radial direction by a value $R_2$. Preferably $R_2$ is smaller than $R_1$.

The conical nose surface 52 is spaced apart from the longitudinal axis 25 in the radial direction by a value $R_V$. It is the case that $R_1 + R_2 = R_V$.

Also shown in FIG. 3 is a radial distance $R_3$, wherein this is the distance of a radially inner surface of the metal shell 18 from the longitudinal axis 25 in the region of the transition segment 54. $R_3$ is greater than $R_V$.

Shown in FIG. 4 is another embodiment of an insulator arrangement 16', which corresponds in general to the insulator arrangement 16 from FIG. 3 in terms of structure and operating principle. The same elements are therefore labeled with the same reference symbols.

In the insulator arrangement 16' from FIG. 4, the axial wall 60' is arranged to be inclined by an angle β with respect to the longitudinal axis 25. The conical nose surface 52' is inclined by an angle α' with respect to the longitudinal axis. The ratio of α' to β preferably lies in a range from 1:0.5 to 1:4, in particular from 1:1 to 1:3.

It is further evident in FIG. 4 that the deflection recess 56 has a radial wall 58' that can be inclined slightly with respect to the radial direction. Moreover, the radial wall 58' transitions into the axial wall 60' through a large radius, so that the radial wall 58' and the axial wall 60' essentially form an arch.

As in the embodiment from FIG. 3, the projection 64' that forms the front end 29 is rounded in design in order to largely avoid turbulence.

FIG. 5 shows another embodiment of an insulator arrangement 16", which corresponds in general to the insulator arrangement 16' from FIG. 4 in terms of structure and operating principle. The same elements are therefore labeled with the same reference symbols. Primarily the differences are explained below.

It is evident that the deflection recess 56" in the embodiment from FIG. 5 is formed in a radially center region of the front end 29, so that the deflection recess 56" is delimited radially toward the inside by an axial inner wall 66 of the body 17. The axial inner wall 66 can be axially oriented, but preferably is oriented at an angle γ with respect to the longitudinal axis 25. The axial wall 60" is oriented at an angle β" with respect to the longitudinal axis 25. The ratio of β" to γ preferably lies in a range from 1:0.5 to 1:2.

The axial inner wall 66 is spaced apart from the insulator arrangement longitudinal bore by a radius $R_7$. In addition, a deepest section of the deflection recess 56" is spaced apart from the insulator arrangement longitudinal bore 19 by a distance $R_4$, which is greater than $R_7$. The deepest section is spaced apart radially from the projection 64" by a distance $R_5$. $R_5$ is preferably greater than or equal to $R_4$.

In FIG. 5, a radially inner section of the front end 29 is axially longer than the projection 64".

In FIG. 6, another embodiment of an insulator arrangement 16''' is shown in which the projection 64''' extends further axially in the direction toward the firing tip 14 than a radially inner end. This condition also applies to the embodiments from FIG. 2 to FIG. 4.

Otherwise, the embodiment from FIG. 6 corresponds to that from FIG. 5 so that the same elements are labeled with the same reference symbols.

In the embodiment from FIG. 6, the angle γ''' of the axial inner wall 66''' is preferably greater than the angle β''' of the axial wall 60'''.

It is a matter of course that the above is a description of one or more preferred exemplary embodiments. The invention is not limited to the specific embodiment disclosed here or the specific embodiments disclosed here, but is defined exclusively by the claims that follow. Moreover, statements contained in the above description relate to specific embodiments and are not to be understood as limitations of the scope of protection of the invention or with regard to the definition of terms used in the claims, except where a term or a phrase is expressly defined above. Various other embodiments and various changes and modifications of the disclosed embodiment(s) arise as a result for the person skilled in the art. All such embodiments, changes, and modifications are to fall within the scope of protection of the attached claims.

In the present specification and in the claims, the terms "for example," "e.g.," "for instance," "such as," and "as, for example" as well as the verbs "have," "contain," and their other verb forms, when used in conjunction with a list of one or more components or other individual parts, are to be understood as non-exhaustive or open, which means that the list is not to be understood such that other additional components or individual parts would be excluded. Other terms are to be understood or construed using their broadest reasonable meaning unless they are used in a context that requires a different interpretation.

The invention claimed is:

1. An insulator arrangement for a spark plug arrangement, comprising:
   an elongated body that has an insulator arrangement longitudinal bore for accommodating a center electrode arrangement and has a front end;

a sealing shoulder is formed on an outer circumferential section of the body, an axial transition section is formed between the sealing shoulder and the front end of the body, wherein the front end of the body is designed such that at least 50% of a gas flow impinging thereon in a first direction is deflected in a direction opposite to the first direction.

2. The insulator arrangement according to claim 1, wherein the front end of the body is oriented generally transversely to a longitudinal axis of the body and has a deflection recess.

3. The insulator arrangement according to claim 2, wherein the deflection recess has an axial depth (T) that lies in a range from 1 mm to 5 mm.

4. The insulator arrangement according to claim 2, wherein a ratio between an axial depth of the deflection recess and an outer radius of the front end lies in a range from 0.1 to 1.0.

5. The insulator arrangement according to claim 2, wherein the deflection recess is spaced apart from an inner circumference of the body in the region of the front end and/or wherein the deflection recess is spaced apart from an outer circumference of the body in the region of the front end.

6. The insulator arrangement according to claim 2, wherein the deflection recess is arch-shaped in cross-section.

7. The insulator arrangement according to claim 6, wherein a ratio between (i) a distance between a deepest section of the deflection recess and an inner circumference of the body in the region of the front end and (ii) a distance between the deepest section of the deflection recess and an outer circumference of the body in the region of the front end lies in a range from 1:3 to 3:1.

8. The insulator arrangement according to claim 1, wherein the transition section is designed as a conical section that is inclined with respect to a longitudinal axis by an angle ($\alpha$) that is greater than 10° and/or is less than 85°.

9. The insulator arrangement according to claim 1, wherein a deflection recess is formed at the front end of the body radially to the outside with an inclined axial wall that is inclined at an angle ($\beta$) of greater than 20° and/or less than or equal to 90°, with respect to a longitudinal axis.

10. A spark plug arrangement for an internal combustion engine, comprising:
a metallic shell that has a shell longitudinal bore;
the insulator arrangement according to claim 1, wherein the body of the insulator arrangement is at least partially accommodated in the shell longitudinal bore; and
a center electrode arrangement that is accommodated in the insulator arrangement longitudinal bore; and
a ground electrode arrangement attached to the metallic shell,
the ground electrode arrangement and the center electrode arrangement are connected to one another by at least one ignition gap,
wherein the ignition gap is arranged inside a prechamber.

11. The spark plug arrangement according to claim 10, wherein the prechamber is covered by a prechamber cap, the prechamber cap has no central bore, and the prechamber cap has at least one radial or lateral bores.

12. The spark plug arrangement according to claim 11, wherein the radial bore(s) is or are oriented such that a gas flow flowing into the prechamber is directed at the ignition gap between the center electrode arrangement and the ground electrode arrangement.

* * * * *